(12) United States Patent
Liu (10) Patent No.: US 7,926,783 B1
(45) Date of Patent: Apr. 19, 2011

(54) SAFETY TYPE QUICK RELEASE CONNECTOR

(76) Inventor: Hsiu-Hsiung Liu, Jhonghe (TW)

(*) Notice: Subject to any disclaimer, the term of this patent is extended or adjusted under 35 U.S.C. 154(b) by 0 days.

(21) Appl. No.: 12/654,010

(22) Filed: Dec. 8, 2009

(51) Int. Cl.
*F16K 51/00* (2006.01)
(52) U.S. Cl. .................................. 251/149.9; 251/149.6
(58) Field of Classification Search ............. 251/149.1, 251/149.6, 149.9
See application file for complete search history.

(56) References Cited

U.S. PATENT DOCUMENTS

| | | | | |
|---|---|---|---|---|
| 2,355,333 | A | * | 8/1944 | Sandell ............................ 52/410 |
| 5,240,023 | A | * | 8/1993 | Shelef et al. ................. 137/15.09 |
| 5,445,358 | A | * | 8/1995 | Anderson ................... 251/149.6 |
| 6,779,777 | B2 | * | 8/2004 | Kouda ......................... 251/149.6 |
| 6,779,778 | B2 | * | 8/2004 | Kuwabara .................. 251/149.9 |

FOREIGN PATENT DOCUMENTS

| | | |
|---|---|---|
| CN | 200820001837.8 | 1/2008 |
| CN | 334244 | 6/2008 |

* cited by examiner

*Primary Examiner* — John K Fristoe, Jr.
(74) *Attorney, Agent, or Firm* — Bacon & Thomas, PLLC (57) ABSTRACT

A safety type quick release connector has a body, a socket base, a sealing valve, a moving base, a pushing assembly and an outer sleeve. The body has an inlet pipe, an outlet tube and a first spring. The socket base is connected to the body and has an outer flange, multiple ball holes and multiple first balls. The sealing vale is mounted in the socket base and has at least one air inlet, an annular groove and a second spring. The moving base is connected to the sealing valve and has an outer flange, an annular lip, multiple ball holes and multiple second balls. The pushing assembly is mounted around the moving base and the sealing valve and has a pushing collar, a third spring and a seal collar. The outer sleeve is mounted around the socket base and the sealing valve between the body and the pushing assembly.

10 Claims, 6 Drawing Sheets

SAFETY TYPE QUICK RELEASE CONNECTOR

BACKGROUND OF THE INVENTION

1. Field of the Invention

The present invention relates to a connector, and more particularly to a safe type quick release connector that can be operated safely with two insertion stages to prevent pressured air from leaking.

2. Description of Related Art

Quick release connectors are always used in pipe connections, such as pneumatic tool systems to connect a pneumatic tool to a pressured air source. A conventional quick release connector comprises multiple steel balls for engaging recesses in a plug. With the engagement between the steel balls and recesses, two pipes can be connected with each other by the quick release connector. Additionally, because the quick release connector is connected to a pressured air source, the conventional quick connector always has a sealing valve to close the path to the pressured air source and keep air from leaking before connection. When a plug is inserted into the conventional quick release connector, the sealing valve will be opened.

However, the sealing valve of the conventional quick release connector will be opened before the plug engaging the balls, the pressured air will discharge from the conventional quick release connector before the plug completely engaging the conventional quick release connector. To connect the conventional quick release connector with the plug is difficult and laborious especially to a person who does not have enough powerful strength. In addition, to release the plug from the conventional quick release connector, an outer sleeve of the conventional quick release connector is pulled to disengage the steel balls from the recesses in the plug and the plug can be detached from the conventional quick release connector. However, during the detaching process, the pressured air keeps flowing into the conventional quick release connector but not being sealed. Thus, the pressured air will apply a huge force to the pipe with the conventional quick release connector, and the user cannot securely hold the pipe with the conventional quick release connector so that the pipe easily injures the user when the pipe is unintentionally released from the user due to the pressured air.

Therefore, the inventor in accordance with the present invention has been filed patents in Republic of China (R.O.C.) with patent number: M334244, in People's Republic of China (P.R.C.) with patent number: ZL200820001837.8 and in United States (US) with application Ser. No. 12/043,254 to solve the aforementioned problems. In order to improve the safety of operating the quick release connector, the inventor invents a safety type quick release connector that can be operated safely with two insertion stages to prevent pressured air from leaking and to overcome the shortcomings.

SUMMARY OF THE INVENTION

The main objective of the invention is to provide a safety type quick release connector that can be operated safely with two insertion stages to prevent pressured air from leaking.

The quick release connector in accordance with the present invention has a body, a socket base, a sealing valve, a moving base, a pushing assembly and an outer sleeve. The body has an inlet pipe, an outlet tube and a first spring. The socket base is connected securely to the body and has an outer flange, multiple ball holes and multiple first balls. The sealing vale is movably mounted in the socket base, abuts the first balls and has at least one air inlet, an annular groove and a second spring. The moving base is connected securely to the sealing valve and has an outer flange, an annular lip, multiple ball holes and multiple second balls. The pushing assembly is movably mounted around the moving base and the sealing valve, abuts the second spring and has a pushing collar, a third spring and a seal collar. The outer sleeve is slidably mounted around the socket base and the sealing valve between the body and the pushing assembly.

Other objects, advantages and novel features of the invention will become more apparent from the following detailed description when taken in conjunction with the accompanying drawings.

BRIEF DESCRIPTION

DETAILED DESCRIPTION OF PREFERRED EMBODIMENT

With reference to FIGS. 1 to 4, a safety type quick connector in accordance with the present invention comprises a body (10), a socket base (20), a sealing valve (30), a moving base (40), a pushing assembly (50) and an outer sleeve (60).

The body (10) is hollow and has a proximal end, a distal end, an inlet pipe (11), an outlet tube (12) and a first spring (13).

The inlet pipe (11) is formed on and protrudes from the proximal end of the body (10) to connect with an air compressor and has an external surface and an outer thread (111). The outer thread (111) is formed on the external surface of the inlet pipe (11).

The outlet tube (12) is formed on the distal end of the body (10), communicates with the inlet pipe (11) and has a forming end, a middle, a connecting end, an outer surface, an air chamber (121), a mounting recess (122), an inner thread (123) and an abutting flange (124). The forming end of the outlet tube (12) is formed with the inlet pipe (11). The air chamber (121) is formed in the outlet tube (12) near the forming end, communicates with the inlet pipe (11) and has a diameter. The mounting recess (122) is formed in the connecting end of the outlet tube (12), communicates with the air chamber (121) and has an internal surface, a protruding face and a diameter larger than the diameter of the air chamber (121). The protruding face is formed on the internal surface of the outlet tube (12) between the air chamber (121) and the mounting recess (122). The inner thread (123) of the outlet tube (12) is formed on the internal surface of the mounting recess (122). The abutting flange (124) is formed around the outer surface of the outlet tube (12) between the middle of the outlet tube (12) and the inlet pipe (11) to form an abutting face.

The first spring (13) is mounted in the air chamber (121) of the outlet tube (12) and has two ends, one of the ends abuts the internal surface of the outlet tube (12) near the forming end.

The socket base (20) is hollow, is connected to the body (10) and has a connecting end, an inserting end, an external surface, a threaded segment (22), an outer flange (23), multiple ball holes (24), multiple first balls (25), multiple releasing holes (26) and a sealing ring (21). The connecting end of the socket base (20) is connected to the connecting end of the outlet tube (12). The threaded segment (22) is formed on the external surface of the socket base (20) at the connecting end and is screwed with the inner thread (123) of the outlet tube (12).

The outer flange (23) is formed around the inserting end of the socket base (20). The ball holes (24) are formed through the external surface of the socket base (20) at intervals near the outer flange (23) and are arranged in a circle around the socket base (20). The first balls (25) are held respectively in the ball holes (25) in the socket base (20). The releasing holes (26) are formed through the external surface of the socket base (20) at intervals between the threaded segment (22) and the ball holes (24) of the socket base (20) and are arranged in a circle around the socket base (20).

The sealing ring (21) is mounted on the connecting end of the socket base (20) and in the mounting recess (122) of the outlet tube (12) and has a curved face (211) and a leakage-proof ring (212). The curved face (211) is formed annularly on the sealing ring (21) at a side facing the protruding face that is formed in the internal surface of the outlet tube (12). The leakage-proof ring (212) is mounted on the sealing ring (21) between the curved face (211) and the protruding face of the outlet tube (12).

The sealing vale (30) is movably mounted in the socket base (20), abuts the first balls (25) of the socket base (20) and has a closed end, an open end, an external surface, an O-ring (32), at least one air inlet (33), a threaded segment (34), an annular groove (35) and a second spring (31). The closed end of the sealing valve (30) is mounted in the air chamber (121) of the outlet tube (12) via the sealing ring (21) of the socket base (20) and abuts the other end of the first spring (13) of the body (10).

The O-ring (32) is mounted around the closed end of the sealing valve (30) and abuts against and closes the sealing ring (21) of the socket base (20) by a force provided by the first spring (13). The at least one air inlet (33) is formed radially through the external surface of the sealing valve (30) near the closed end of the sealing valve (30) and communicates with the socket base (20). The threaded segment (34) is formed on the external surface of the sealing valve (30) at the open end. The annular groove (35) is formed around the external surface of the sealing valve (30) near the threaded segment (34) of the sealing valve (30).

The second spring (31) is mounted in the sealing valve (30) and has two ends, one of the ends abuts the sealing valve (30) near the at least air hole (33).

The moving base (40) is hollow, is connected securely to the sealing valve (30) and has a connecting end, an inserting end, an inner surface, an outer surface, an inner thread (41), an outer flange (42), an annular lip (43), multiple ball holes (44) and multiple second balls (45). The connecting end of the moving base (40) is connected to the open end of the sealing valve (30). The inner thread (41) is formed on the inner surface of the moving base (40) at the connecting end and is screwed with the threaded segment (34) of the sealing valve (30). The outer flange (42) is formed around the inserting end of the moving base (40). The annular lip (43) is formed on and protrudes inward from the inner surface of the inserting end of the moving base (40). The ball holes (44) are formed through the outer surface of the moving base (40) at intervals near the outer flange (42) and are arranged in a circle around the moving base (40). The second balls (45) are held respectively in the ball holes (44) in the moving base (40).

The pushing assembly (50) is movably mounted around the moving base (40) and the sealing valve (30) and has a pushing collar (51), a third spring (52), a seal collar (53) and a seal (54).

The pushing collar (51) is movably mounted around the open end of the sealing valve (30) and the connecting end of the moving base (40), abuts the second balls (45) of the moving base (40) and has an abutting end, a holding end, an internal surface, a spring recess (511), a ball recess (512) and a holding flange (513). The abutting end of the pushing collar (51) is mounted around the second balls (45) of the moving base (40). The holding end of the pushing collar (51) is mounted around the sealing valve (30) and faces the outer flange (23) of the socket base (20). The spring recess (511) is formed in the holding end of the pushing collar (51). The ball recess (512) is formed in the abutting end of the pushing collar (51) in the abutting end to mount around and hold the second balls (45) of the moving base (40). The holding flange (513) is formed around and protrudes from the holding end of the pushing collar (51).

The third spring (52) is mounted around the sealing valve (30) between the socket base (20) and the pushing collar (51) and has two ends respectively abut the outer flange (23) of the socket base (20) and the pushing collar (51) in the spring recess (511) to make the ball recess (512) of the pushing collar (51) abutting the second balls (45) of the moving base (40).

The seal collar (53) is movably mounted between the sealing valve (30) and the moving base (40) and has an inner end, an outer end, an internal surface and a mounting recess (531). The inner end of the seal collar (53) is movably mounted in the open end of the sealing valve (30). The outer end of the seal collar (53) is mounted in the moving base (40) and abuts the annular lip (43) of the moving base (40). The mounting recess (531) is formed in inner end of the seal collar (53) and communicates with the sealing valve (30).

The seal (54) is mounted in the mounting recess (531) of the seal collar (53) and abuts the other end of the second spring (31) of the sealing valve (30) to make the seal collar (53) abutting against the annular lip (43) of the moving base (40).

The outer sleeve (60) is slidably mounted around the socket base (20) and the sealing valve (30) between the body (10) and the pushing assembly (50) and has a front sleeve (61) and a rear sleeve (62). The front sleeve (61) is slidably mounted around the socket base (20) and the body (10) and has an open end, a screwed end (611), an external surface, an internal surface, a reeding (612), an inclined face (613) and a fourth spring (614). The open end of the front sleeve (61) is mounted around the outlet tube (12) of the body (10) and communicates with the releasing holes (26) of the socket base (20). The screwed end (611) of the front sleeve (61) is mounted around the first balls (25) of the socket base (20). The reeding (612) is formed on the external surface of the front sleeve (61) near the open end of the front sleeve (61). The inclined face (613) is formed on the internal surface of the front sleeve (61) near the screwed end (611) and abuts the first balls (25) of the socket base (20) by the third spring (52) pushing the outer flange (23) of the socket base (20). The fourth spring (614) is mounted around the outlet tube (12) of the body (10) between the abutting face of the abutting flange (124) and the front sleeve (61) to make the inclined face (613) of the front sleeve (61) abutting the first balls (25) of the socket base (20).

The rear sleeve (62) is slidably mounted around the sealing sleeve (30) and the pushing assembly (50), is connected to the front sleeve (61) and has a connecting end (621) and a holding end. The connecting end (621) of the rear sleeve (62) is securely connected to the screwed end (611) of the front sleeve (61). The holding end of the rear sleeve (62) is mounted around the pushing collar (51) of the pushing assembly (50) and may abut the holding flange (513) of the pushing collar (51).

Figure 1:
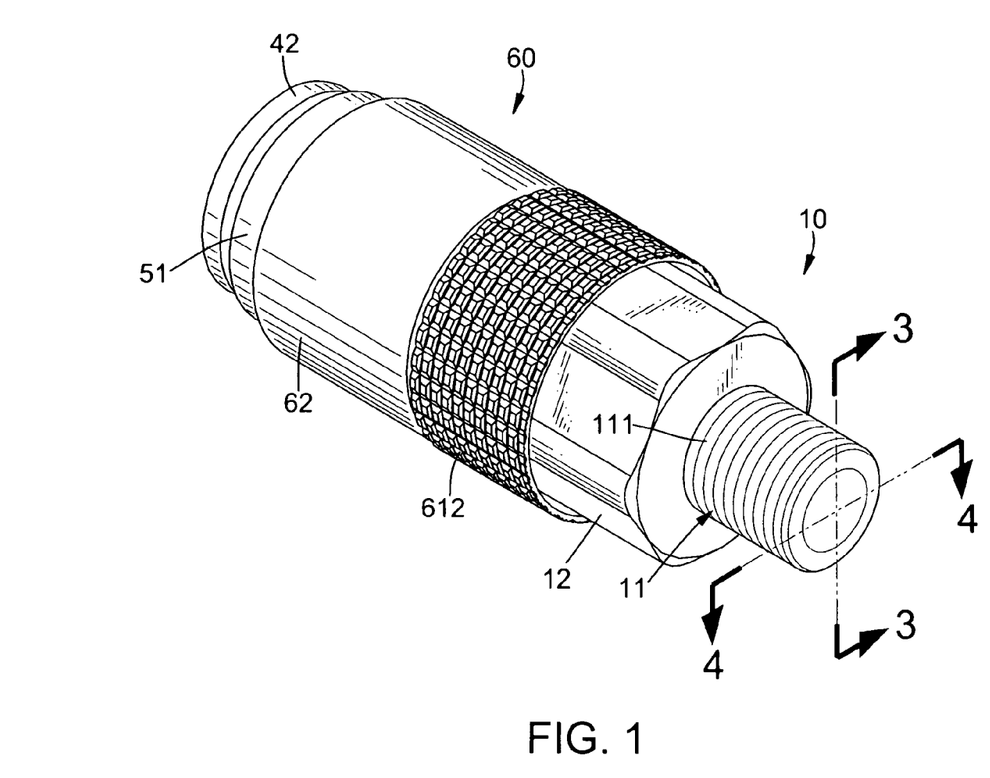
FIG. 1 is a perspective view of a safety type quick release connector in accordance with the present invention.
Figure 2:
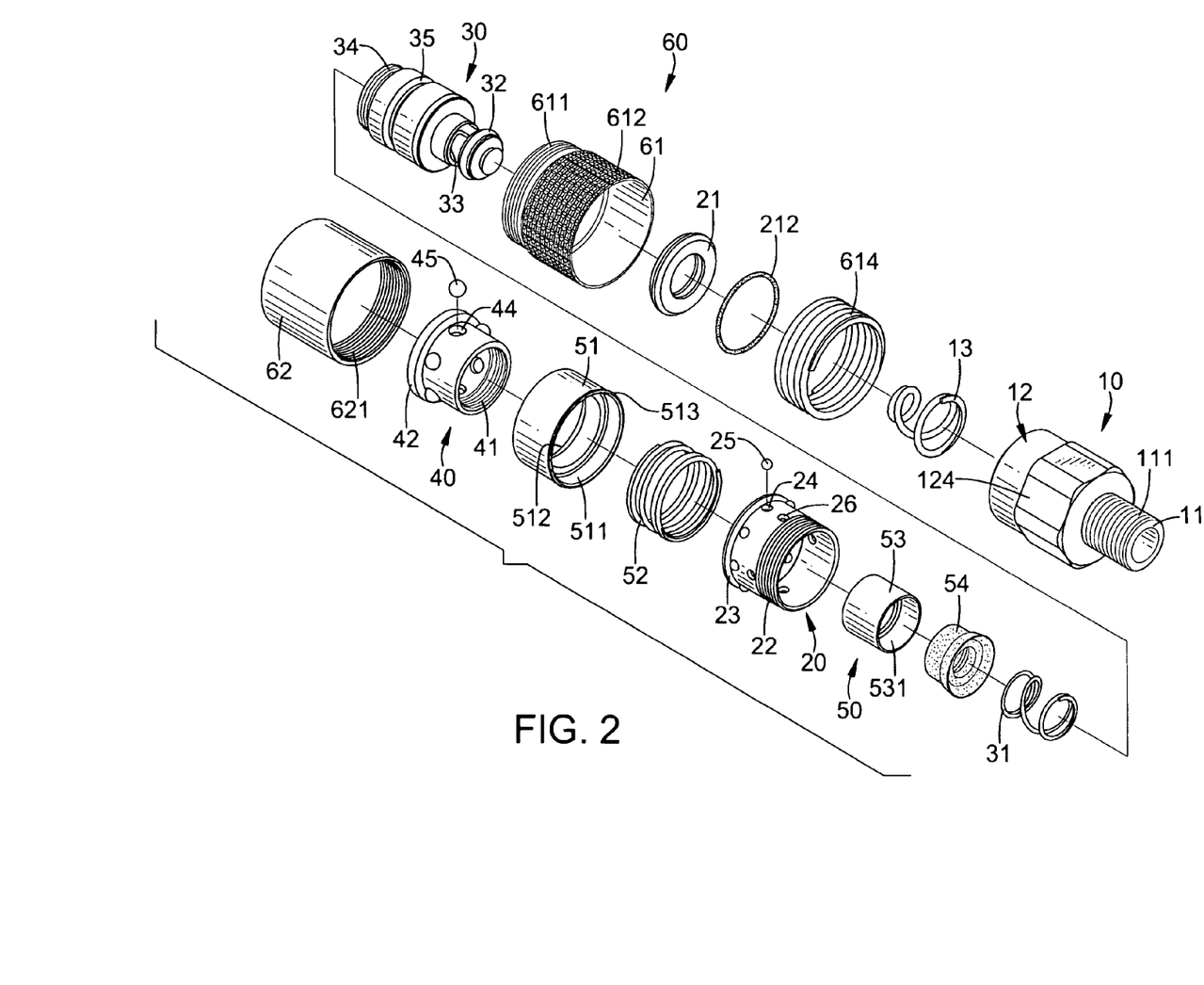
FIG. 2 is an exploded perspective view of the quick release connector in FIG. 1.
Figure 3:
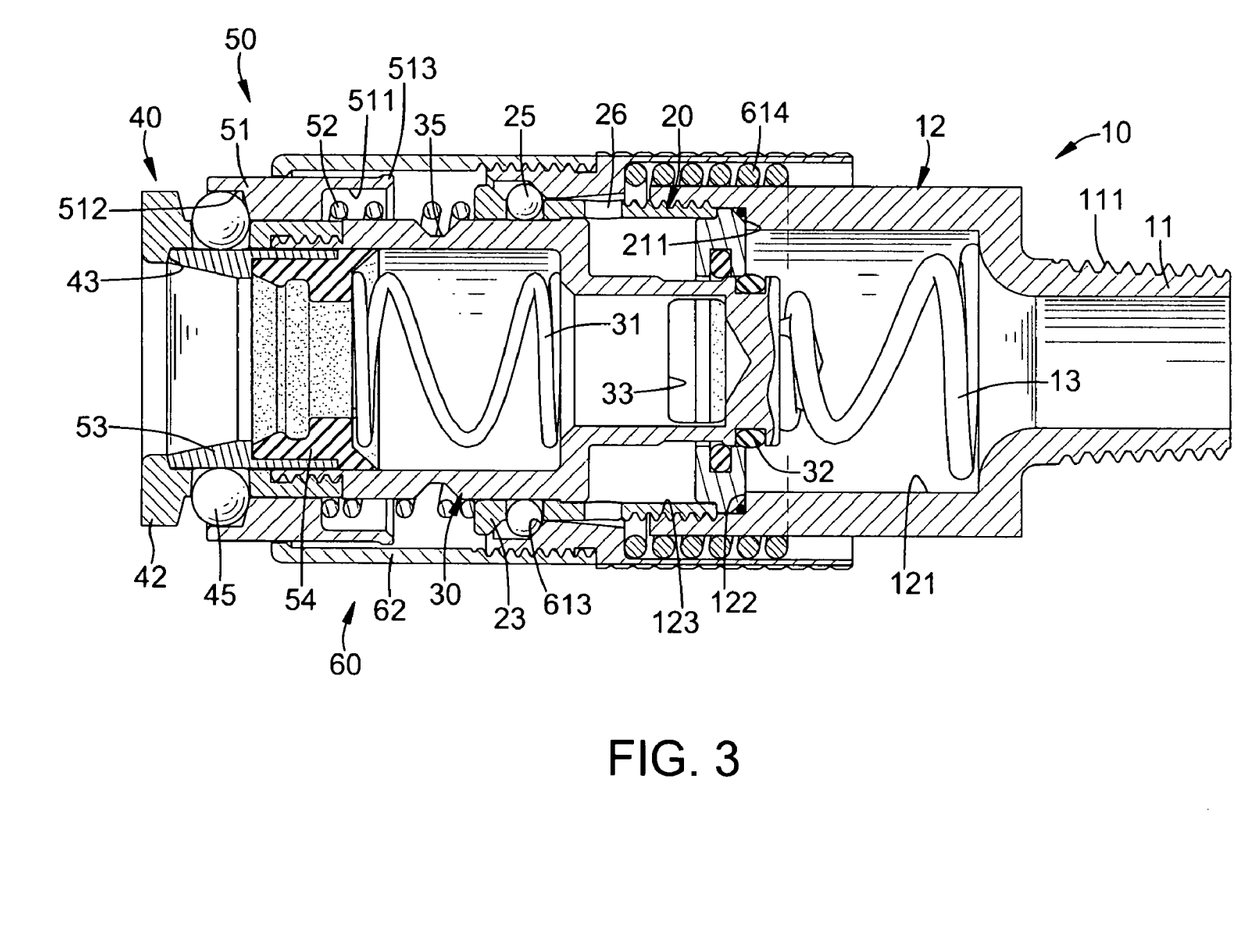
FIG. 3 is a side view in partial section of the quick release connector along line 3-3 in FIG. 1.
Figure 4:
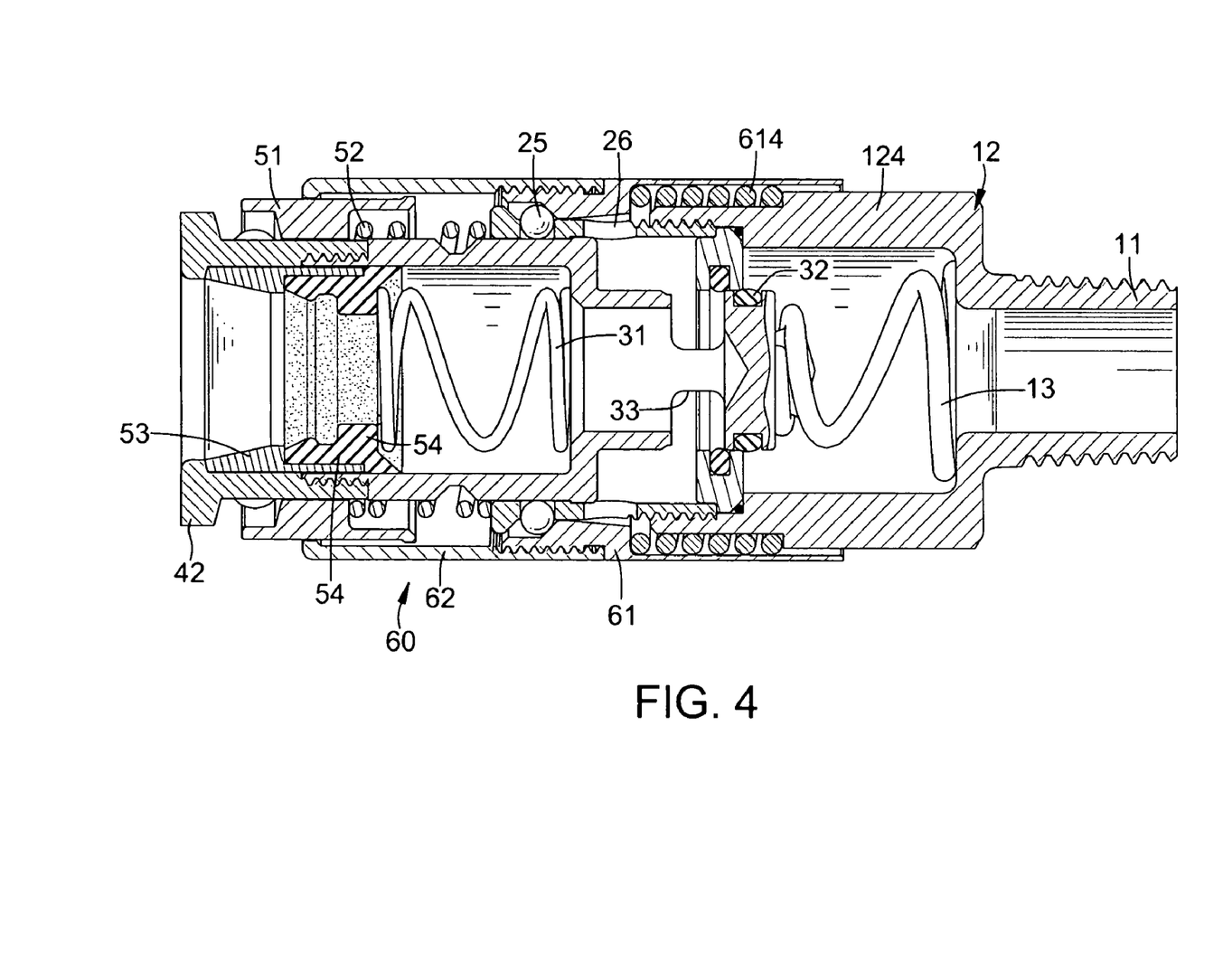
FIG. 4 is another side view in partial section of the quick release connector along line 4-4 in FIG. 1.

With reference to FIGS. 3 and 4, when the inlet pipe (11) of the body (10) is connected to an air compressor, before the quick release connector being connected with a plug, the O-ring (32) on the closed end of the sealing valve (30) abuts against and closes the sealing ring (21) of the socket base (20) by a force of the first spring (13). The pressured air of the air compressor in the air chamber (121) of the outlet tube (12), and the pressured air of the air compressor will be blocked by the closed end and the O-ring (32) of the sealing valve (30) and the sealing ring (21) of the socket base (20) and is kept from leaking.

The safety type quick release connector in accordance with the present invention has two insertion stages to connect with a plug.

Figure 5:
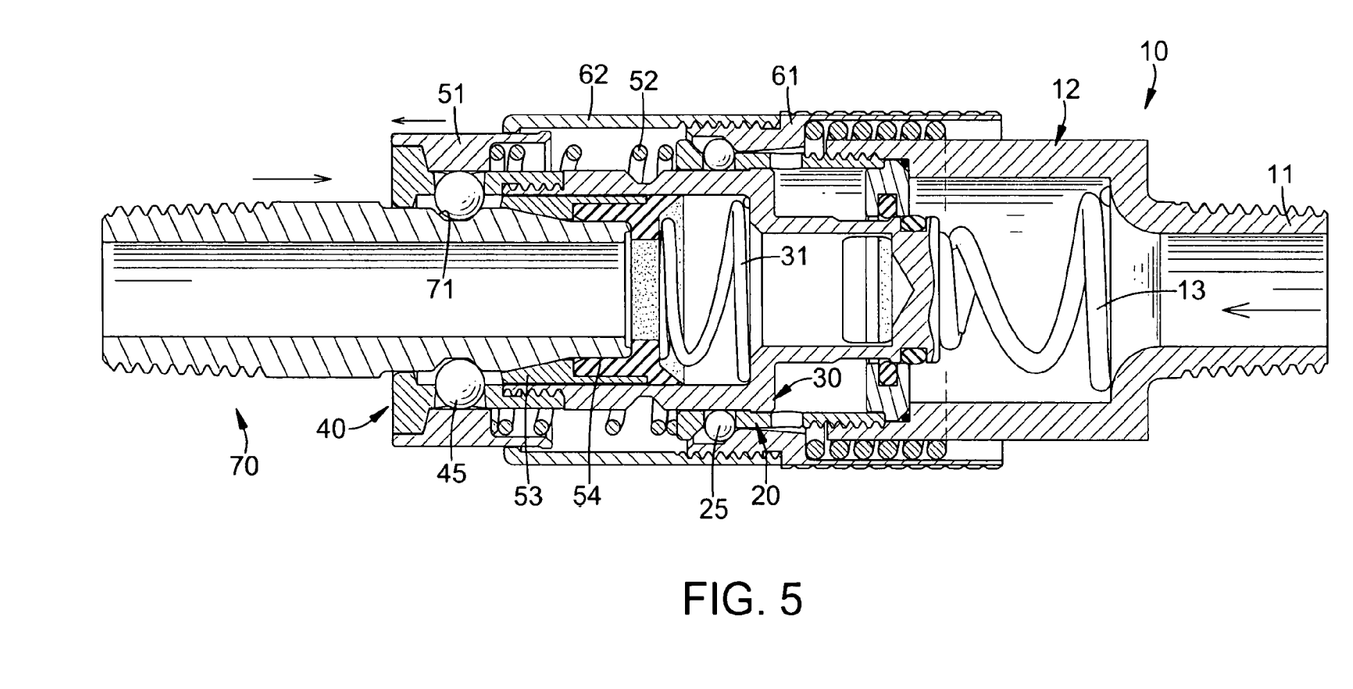
FIG. 5 is an operational side view in partial section of the quick connector in FIG. 1 showing a plug being inserted into the connector but the connector keeping sealed.

In the first operating stage, with reference to FIG. 5, when a plug (70) with an annular engaging recess (71) connected to a tool is inserted into the seal collar (53) and the seal (54) of the pushing assembly (50) via the inserting end of the moving base (40). The plug (70) will abut and push against the seal collar (53) and the seal (54) to move relative to the sealing valve (30) and the moving base (40) and to press the second spring (31). When the seal collar (53) and the seal (54) of the pushing assembly (50) is moved with the plug (70), the second balls (45) will retract into the engaging recess (71). At the same time, the third spring (52) will push the pushing collar (51) moving relative to the rear sleeve (61) of the outer sleeve (60) toward the outer flange (42) of the moving base (40). Then, the second balls (40) will be abutted and squeezed between the internal surface of the pushing collar (51), the ball holes (44) of the moving base (40) and the engaging recess (71) of the plug (70).

During the first insertion stage, the sealing valve (30) is still kept stationary, so the sealing effect provided by the O-ring (32) on the closed end of the sealing valve (30) that pressed by the first spring (13) to the pressured air still works. Furthermore, the pressure of the pressured air also provide the O-ring (32) on the moving base (40) a force for abutting against the sealing ring (21) of the socket base (20), and this can completely prevent the pressured air of the air compressor from leaking to the plug (70).

Figure 6:
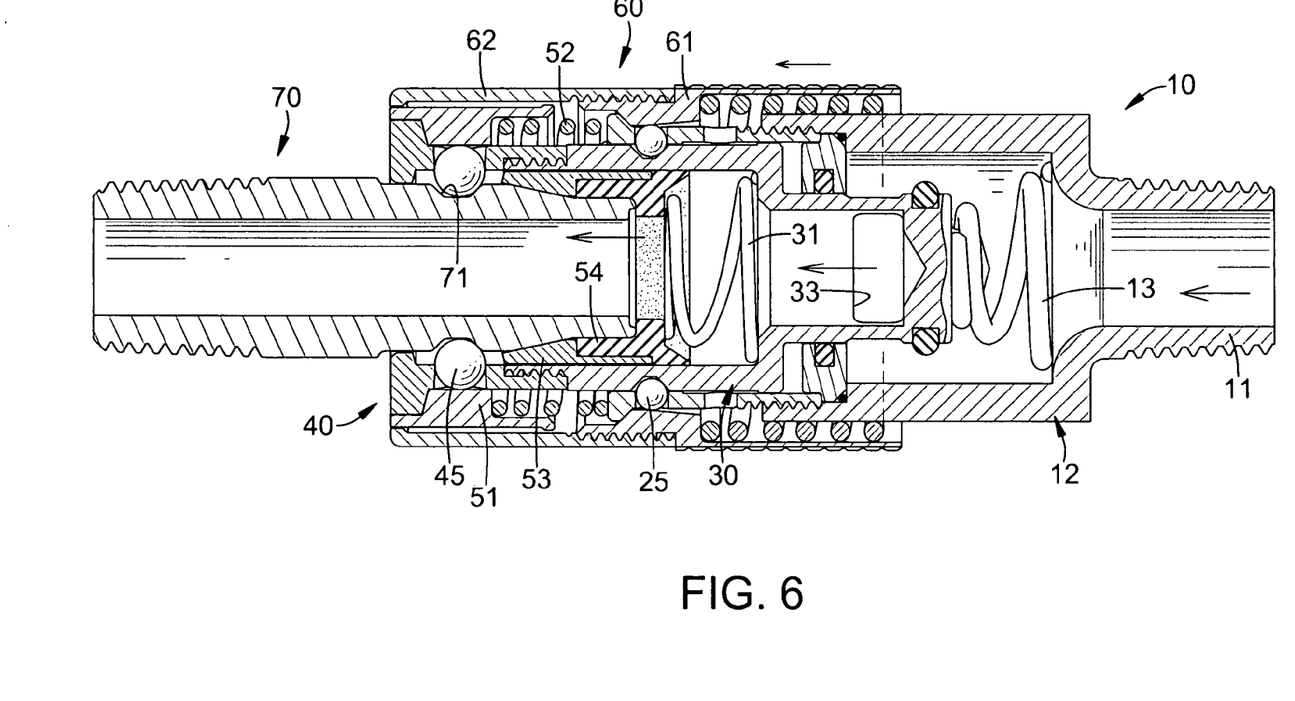
FIG. 6 is an operational side view in partial section of the quick connector in FIG. 1 showing a plug being further inserted into the connector and the connector being unsealed.

With reference to FIG. 6, in the second insertion stage, when the plug (70) is further inserted, the pushing collar (51) and the moving base (40) will be moved relative to the rear sleeve (62) due to the abutment of the second balls (45) with the engaging recess (71) of the plug (70) to press the third spring (52) between the pushing collar (51) and the socket base (20). Consequently, the O-ring (32) on the closed end of the sealing valve (30) will leave the position where closes the sealing ring (21) of the socket base (20) to allow the pressured air to flow into the plug (70) via the at least one air inlet (33) of the sealing valve (30). Then, the pressured air will flow into the tool that is connected with the plug (70) via the pushing assembly (50) and the plug (70). At the same time, when the sealing valve (30) moves relative to the socket base (20) and the body (10), the first balls (25) of the socket base (20) will be pressed by the inclined face (613) of the front sleeve (61) with the force provided by the fourth spring (614) to move inward and engage the annular groove (35) of the sealing valve (30) and to hold the sealing valve (30) firmly with the socket base (20).

In the two insertion stages, the plug (70) and the sealing valve (30) can be respectively engaged the second balls (45) and the first balls (25), and the balls (45, 25) will not escaped from the plug (70) and the sealing valve (30). Then, the plug (70) is not detached from the connector unintentionally even when the plug (70) has not been completely inserted into and connected with the safety type quick release connector. To connect the plug (70) with the safety type quick release connector is easy, non-laborious and save. In addition, if the pressure of the air is over a predetermined level, the air will be released from the releasing holes (26) in the socket base (20) and the open end of the front sleeve (61).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A safety type quick release connector comprising:
   a body being hollow and having
      a proximal end;
      a distal end;
      an inlet pipe formed on and protruding from the proximal end of the body;
      an outlet tube formed on the distal end of the body, communicating with the inlet pipe and having an air chamber; and
      a first spring mounted in the air chamber of the outlet tube and having two ends;
   a socket base being hollow, connected to the body and having
      a connecting end connected to the outlet tube;
      an inserting end;
      an external surface;
      an outer flange formed around the inserting end of the socket base;
      multiple ball holes formed through the external surface of the socket base at intervals near the outer flange and arranged in a circle around the socket base; and
      multiple first balls held respectively in the ball holes in the socket base;
   a sealing valve movably mounted in the socket base, abutting the first balls of the socket base and having
      a closed end mounted in the air chamber of the outlet tube via the connecting end of the socket base and one of the ends of the first spring abutting the outlet tube and the other end of the first spring abutting the closed end of the sealing valve;
      an open end;
      an external surface;
      at least one air inlet formed radially through the external surface of the sealing valve near the closed end of the sealing valve and communicating with the socket base;
      an annular groove formed around the external surface of the sealing valve near the open end of the sealing valve; and
      a second spring mounted in the sealing valve and having two ends;

a moving base being hollow, connected securely to the sealing valve and having
   a connecting end connected to the open end of the sealing valve;
   an inserting end;
   an inner surface;
   an outer surface;
   an outer flange formed around the inserting end of the moving base;
   an annular lip formed on and protruding inward from the inner surface of the inserting end of the moving base;
   multiple ball holes formed through the outer surface of the moving base at intervals near the outer flange and arranged in a circle around the moving base; and
   multiple second balls held respectively in the ball holes in the moving base;
a pushing assembly movably mounted around the moving base and the sealing valve and having
   a pushing collar movably mounted around the open end of the sealing valve and the connecting end of the moving base, abutting the second balls of the moving base and having
      an abutting end mounted around the second balls of the moving base;
      a holding end mounted around the sealing valve and faced the outer flange of the socket base;
      an internal surface;
      a spring recess formed in the holding end of the pushing collar; and
      a ball recess formed in the abutting end of the pushing collar to mount around and hold the second balls of the moving base;
   a third spring mounted around the sealing valve between the socket base and the pushing collar and having two ends respectively abutting the outer flange of the socket base and the pushing collar in the spring recess to make the ball recess of the pushing collar abutting the second balls of the moving base; and
   a seal collar movably mounted between the sealing valve and the moving base and having
      an inner end movably mounted in the open end of the sealing valve; and
      an outer end mounted in the moving base and abutting the annular lip of the moving base; and
an outer sleeve slidably mounted around the socket base and the sealing valve between the body and the pushing assembly.

2. The safety type quick release connector as claimed in claim 1, wherein
the outlet tube has
   a forming end formed with the inlet pipe and abutting the first spring;
   a middle;
   a connecting end connected to the connecting end of the socket base;
   an outer surface; and
   a mounting recess formed in the connecting end of the outlet tube, communicating with the air chamber and having
      an internal surface;
      a protruding face formed on the internal surface of the mounting recess between the air chamber and mounting recess; and
      a diameter;
   wherein the air chamber is formed in the outlet tube near the forming end, communicates with the inlet pipe and has a diameter smaller than the diameter of the mounting recess;
the socket base has a sealing ring mounted on the connecting end of the socket base and in the mounting recess of the outlet tube and having
   a curved face annularly on the sealing ring at a side facing the protruding face of the mounting recess of the outlet tube; and
   a leakage-proof ring mounted on the sealing ring between the curved face and the protruding face of the mounting recess of the outlet tube;
wherein the closed end of the sealing valve is mounted in the air chamber of the outlet tube via the sealing ring of the socket base; and
the sealing valve has a O-ring mounted around the closed end of the sealing valve, abutted against and closed the sealing ring of the socket base by a force provided by the first spring.

3. The safety type quick release connector as claimed in claim 2, wherein
the seal collar has a mounting recess formed in the inner end of the seal collar and communicating with the sealing valve; and
the pushing assembly has a seal mounted in the mounting recess of the seal collar, one of the ends of the second spring abutting the sealing valve near the at least air hole and the other end of the second spring of the sealing valve abutting the seal to make the seal collar abutting against the annular lip of the moving base.

4. The safety type quick release connector as claimed in claim 3, wherein
the outlet tube has an abutting flange formed around the outer surface of the outlet tube between the middle of the outlet tube and the inlet pipe to form an abutting face;
the pushing collar has a holding flange formed around and protruding from the holding end of the pushing collar; and
the outer sleeve has
   a front sleeve slidably mounted around the socket base and the body and having
      an open end mounted around the outlet tube of the body;
      a screwed end mounted around the first balls of the socket base;
      an external surface;
      an internal surface;
      a reeding formed on the external surface of the front sleeve near the open end of the front sleeve;
      an inclined face formed on the internal surface of the front sleeve near the screwed end and abutting the first balls of the socket base by the third spring pushing the outer flange of the socket base; and
      a fourth spring mounted around the outlet tube of the body between the abutting face of the abutting flange and the front sleeve to make the inclined face of the front sleeve abutting the first balls of the socket base; and
   a rear sleeve slidably mounted around the sealing sleeve and the pushing assembly, connected to the front sleeve and having
      a connecting end securely connected to the screwed end of the front sleeve; and
      a holding end mounted around the pushing collar of the pushing assembly to abut the holding flange of the pushing collar.

5. The safety type quick release connector as claimed in claim 4, wherein the inlet pipe of the body has
 an external surface; and
 an outer thread formed on the external surface of the inlet pipe to connect with an air compressor.

6. The safety type quick release connector as claimed in claim 5, wherein
 the outlet tube has an inner thread formed on the internal surface of the mounting recess; and
 the socket base has a threaded segment formed on the external surface of the socket base at the connecting end and screwed with the inner thread of the outlet tube.

7. The safety type quick release connector as claimed in claim 6, wherein
 the socket base has multiple releasing holes formed through the external surface of the socket base at intervals between the threaded segment and the ball holes of the socket base and arranged in a circle around the socket base; and
 the open end of the front sleeve communicates with the releasing holes of the socket base.

8. The safety type quick release connector as claimed in claim 7, wherein
 the sealing vale has a threaded segment formed on the external surface of the sealing valve at the open end; and
 the moving base has an inner thread formed on the inner surface of the moving base at the connecting end and screwed with the threaded segment of the sealing valve.

9. The safety type quick release connector as claimed in claim 2, wherein
 the outlet tube has an abutting flange formed around the outer surface of the outlet tube between the middle of the outlet tube and the inlet pipe;
 the pushing collar has a holding flange formed on and protruding from the holding end of the pushing collar; and
 the outer sleeve has
  a front sleeve slidably mounted around the socket base and the body and having
   an open end mounted around the outlet tube of the body;
   a screwed end mounted around the first balls of the socket base;
   an external surface;
   an internal surface;
   a reeding formed on the external surface of the front sleeve near the open end of the front sleeve;
   an inclined face formed on the internal surface of the front sleeve near the screwed end and abutting the first balls of the socket base by the third spring pushing the outer flange of the socket base; and
  a fourth spring mounted around the outlet tube of the body between the abutting flange and the front sleeve to make the inclined face of the front sleeve abutting the first balls of the socket base; and
 a rear sleeve slidably mounted around the sealing sleeve and the pushing assembly, connected to the front sleeve and having
  a connecting end securely connected to the screwed end of the front sleeve; and
  a holding end mounted around the pushing collar of the pushing assembly to abut the holding flange of the pushing collar.

10. The safety type quick release connector as claimed in claim 1, wherein
 the inlet pipe has
  an external surface; and
  an outer thread formed on the external surface of the inlet pipe to connect with an air compressor;
 the outlet tube has an inner thread formed on the internal surface of the mounting recess;
 the socket base has
  a threaded segment formed on the external surface of the socket base at the connecting end and screwed with the inner thread of the outlet tube; and
  multiple releasing holes formed through the external surface of the socket base at intervals between the threaded segment and the ball holes of the socket base and arranged in a circle around the socket base;
 the sealing vale has a threaded segment formed on the external surface of the sealing valve at the open end; and
 the moving base has an inner thread formed on the inner surface of the moving base at the connecting end and screwed with the threaded segment of the sealing valve.

\* \* \* \* \*